United States Patent
Kozarekar et al.

(10) Patent No.: US 7,398,147 B2
(45) Date of Patent: Jul. 8, 2008

(54) OPTIMAL ENGINE OPERATING POWER MANAGEMENT STRATEGY FOR A HYBRID ELECTRIC VEHICLE POWERTRAIN

(75) Inventors: Shailesh Kozarekar, Novi, MI (US); Ming Kuang, Canton, MI (US); Joseph Supina, Belleville, MI (US); Fazal Syed, Canton, MI (US); Morgan Andreae, Cambridge, MA (US); Vincent Freyermuth, Plainfaing (FR)

(73) Assignee: Ford Global Technologies, LLC, Dearborn, MI (US)

( * ) Notice: Subject to any disclaimer, the term of this patent is extended or adjusted under 35 U.S.C. 154(b) by 451 days.

(21) Appl. No.: 11/161,424

(22) Filed: Aug. 2, 2005

(65) Prior Publication Data

US 2007/0032926 A1    Feb. 8, 2007

(51) Int. Cl.
*B60K 6/20*    (2007.10)
*B60K 6/04*    (2006.01)
(52) U.S. Cl. .................. 701/101; 180/65.2; 903/941; 701/22
(58) Field of Classification Search .................. 701/22
See application file for complete search history.

(56) References Cited

U.S. PATENT DOCUMENTS

| | | | |
|---|---|---|---|
| 5,495,912 A | 3/1996 | Gray, Jr. et al. | |
| 6,173,574 B1 | 1/2001 | Obayashi et al. | |
| 6,330,504 B1 | 12/2001 | Toukura et al. | |
| 6,336,063 B1 | 1/2002 | Lennevi | |
| 6,500,089 B2 | 12/2002 | Lasson et al. | |
| 6,687,581 B2 | 2/2004 | Deguchi et al. | |
| 6,755,266 B2 | 6/2004 | Lasson | |
| 6,790,159 B1 | 9/2004 | Buchannan et al. | |
| 6,847,189 B2 | 1/2005 | Frank | |
| 6,957,137 B2* | 10/2005 | Hubbard et al. | 701/54 |
| 7,076,356 B2* | 7/2006 | Hubbard et al. | 701/55 |
| 7,110,871 B2* | 9/2006 | Hubbard et al. | 701/54 |
| 7,131,708 B2* | 11/2006 | Tao et al. | 303/152 |
| 7,149,618 B2* | 12/2006 | Heap et al. | 701/102 |
| 7,200,476 B2* | 4/2007 | Cawthorne et al. | 701/51 |
| 2003/0006076 A1 | 1/2003 | Tamor | |
| 2004/0238243 A1* | 12/2004 | King et al. | 180/65.2 |
| 2005/0080537 A1* | 4/2005 | Cawthorne et al. | 701/51 |
| 2005/0080538 A1* | 4/2005 | Hubbard et al. | 701/54 |
| 2005/0080539 A1* | 4/2005 | Hubbard et al. | 701/54 |
| 2005/0182526 A1* | 8/2005 | Hubbard et al. | 701/1 |
| 2005/0209760 A1* | 9/2005 | Tabata et al. | 701/53 |
| 2005/0255965 A1* | 11/2005 | Tao et al. | 477/4 |
| 2005/0256633 A1* | 11/2005 | Heap et al. | 701/101 |
| 2006/0009884 A1* | 1/2006 | Mensler et al. | 701/1 |
| 2006/0021809 A1* | 2/2006 | Xu et al. | 180/65.2 |
| 2007/0032926 A1* | 2/2007 | Kozarekar et al. | 701/22 |
| 2007/0078580 A1* | 4/2007 | Cawthorne et al. | 701/51 |
| 2007/0093953 A1* | 4/2007 | Heap et al. | 701/103 |

* cited by examiner

*Primary Examiner*—Thomas G. Black
*Assistant Examiner*—Shelley Chen
(74) *Attorney, Agent, or Firm*—David B. Kelly; Brooks Kushman P.C.

(57) ABSTRACT

A method is disclosed for managing power in a hybrid electric vehicle powertrain having multiple components, including an engine, a motor, a generator and a high voltage battery. Power losses in the individual components are computed. An engine speed corresponding to a minimum value for the power losses is selected to achieve optimal total powertrain efficiency.

12 Claims, 3 Drawing Sheets

OPTIMAL ENGINE SPEED TABLE

| $P_{total\_cmd}$ \ $V_{veh}$ | 10 mph | 20 mph | 30 mph | 40 mph | 50 mph | 60 mph |
|---|---|---|---|---|---|---|
| 5 kw | $\omega_{eng}$ | --- | --- | --- | $\omega_{eng}$ | --- |
| 10 KW | --- | --- | --- | --- | --- | --- |
| 15 KW | --- | --- | $\omega_{eng}$ | --- | --- | --- |
| 15 KW | --- | --- | --- | --- | --- | --- |
| 20 KW | --- | --- | --- | --- | --- | --- |
| 30 KW | --- | $\omega_{eng}$ | --- | --- | --- | $\omega_{eng}$ |
| 40 KW | --- | --- | --- | $\omega_{eng}$ | --- | --- |

OPTIMAL ENGINE OPERATING POWER MANAGEMENT STRATEGY FOR A HYBRID ELECTRIC VEHICLE POWERTRAIN

BACKGROUND OF THE INVENTION

1. Field of the Invention

The invention relates to management of power from two power sources in a hybrid electric vehicle powertrain.

2. Background Discussion

A series-parallel hybrid electric vehicle powertrain has two power sources for delivering driving power to vehicle traction wheels. An example of a series-parallel hybrid electric vehicle powertrain may be seen by referring to U.S. patent application Ser. No. 10/248,886, filed Feb. 27, 2003, entitled "Closed-Loop Power Control System for Hybrid Electric Vehicles," now U.S. Pat. No. 6,991,053, dated Jan. 31, 2006, which is assigned to the assignee of the present invention.

The first power source in a powertrain of the kind disclosed in the co-pending patent application identified above comprises a combination of an engine and a generator that are mechanically coupled by a planetary gearset. A second power source is an electric drive system comprising a motor, the generator and a high voltage battery that are electrically coupled. The battery acts as an energy storing medium for the generator and the motor.

When the powertrain is operating in a driving mode that includes the first power source, the planetary gearset, together with the engine and the generator, cooperate to effect a power delivery characteristic that is analogous to the characteristic of a conventional continuously variable transmission in a vehicle powertrain. This is done by controlling generator speed, the generator being connected to the sun gear of the planetary gearset and the engine being connected to a planetary carrier. The ring gear of the planetary gearset is connected to the vehicle traction wheels through torque transfer gearing and a differential-and-axle-assembly.

Because of the fixed ratio of the planetary gearset and the variable generator speed, which achieve a decoupling of engine speed and vehicle speed, the planetary gearset acts as a power divider that divides engine output power and distributes power to torque transfer gearing and to the generator through separate power flow paths. The portion of the power delivered from the engine to the generator can be transmitted to the electric motor and then to the differential-and-axle assembly through the torque transfer gearing. Generator torque functions as a torque reaction as engine power is delivered through the planetary gearset.

When the vehicle is operating using the second power source, the electric motor draws power from the battery and provides driving torque to the vehicle traction wheels independently of the first power source. The two power sources can provide traction power for the vehicle either simultaneously or independently.

The two power sources must be integrated to work together seamlessly to meet a driver's demand for power within system power constraints while optimizing total powertrain system efficiency and performance. This requires a coordination of control of the two power sources.

As in the case of conventional continuously variable vehicle transmissions, a series-parallel hybrid powertrain can achieve better fuel economy and reduce undesirable exhaust gas emissions by operating the engine in its most efficient speed and torque operating region whenever possible. It also can potentially further improve fuel economy and quality of exhaust gas emissions, compared to a conventional continuously variable transmission, because the engine size can be reduced while providing the same vehicle performance. Still further, the engine can be stopped if operational conditions are not favorable for fuel economy and emissions purposes.

A vehicle system controller is used in a series-parallel hybrid powertrain to determine an engine torque and engine speed operating region to meet a driver demand for power while maintaining optimal fuel economy and optimum emissions quality under various vehicle operating conditions.

An example of a prior art hybrid powertrain system having a hydraulic pump and motor, rather than an electric generator and motor, is disclosed in U.S. Pat. No. 5,495,912. The combination of the hydraulic pump and motor, together with an accumulator, in the powertrain of the '912 patent, is analogous to the combination of an electric motor and a battery in a hybrid electric powertrain with divided power flow paths.

Both the powertrain system of the '912 patent and the powertrain system disclosed in the co-pending patent application identified above can provide an effective power command that is satisfied by two power sources, and both powertrain systems are capable of regenerative braking. In the case of the powertrain system of the '912 patent, the strategy used by the powertrain controller may achieve the best brake specific fuel consumption operating region for the engine for any given driver power demand by using the hydraulic pump and motor to control the engine. That is not sufficient, however, to achieve optimum total powertrain system efficiency since power losses in other components and sub-systems of the powertrain of the '912 patent are not taken into consideration.

SUMMARY OF THE INVENTION

The invention comprises a method and strategy that takes into account the total system efficiency in a determination of engine speed and torque for a given vehicle speed and a given total power command. The total power command is based on a driver demand and a battery charge or discharge power request. This is done in a manner that will achieve maximum total powertrain system efficiency.

The operating strategy of the invention recognizes that engine efficiency has the most influence on the total system efficiency. Although it is possible to operate the engine at a high efficiency for a given driver demand because of the divided engine power flow paths, as previously explained, the method of the invention does not achieve high efficient engine operation at the expense of a lowering of the efficiency of the motor and the generator. Any decrease in the efficiency of the motor and generator is taken into account in meeting a driver demand for power while making a determination of the most desirable engine speed and engine torque.

The strategy of the invention determines engine speed and torque values to meet the goal of achieving maximum system efficiency by considering the efficiency of each of the sub-systems and components of the overall powertrain system. In this way, an engine operating speed and torque region is determined that will result in full benefits of a hybrid powertrain system while achieving maximum total powertrain efficiency.

In practicing the invention, a power loss for each of the several powertrain system components is made for a given total power command and a given vehicle speed. Those losses are summed to obtain a total powertrain system loss. The engine speed command corresponding to a minimum value for the total powertrain system loss then is determined.

According to one aspect of the invention, a change in the total power command will be followed by a computation of changed engine torque command. A change in engine torque command is made as a quick response to a change in the total power command.

According to another aspect of the invention, engine speed is filtered following a change in total power command to effect a controlled rate of increase in engine speed.

According to still another aspect of the invention, the engine torque command is filtered following a change in total power command to effect a controlled rate of increase in the engine torque command during a transition between total power command values.

DETAILED DESCRIPTION OF AN EMBODIMENT OF THE INVENTION

Figure 1:
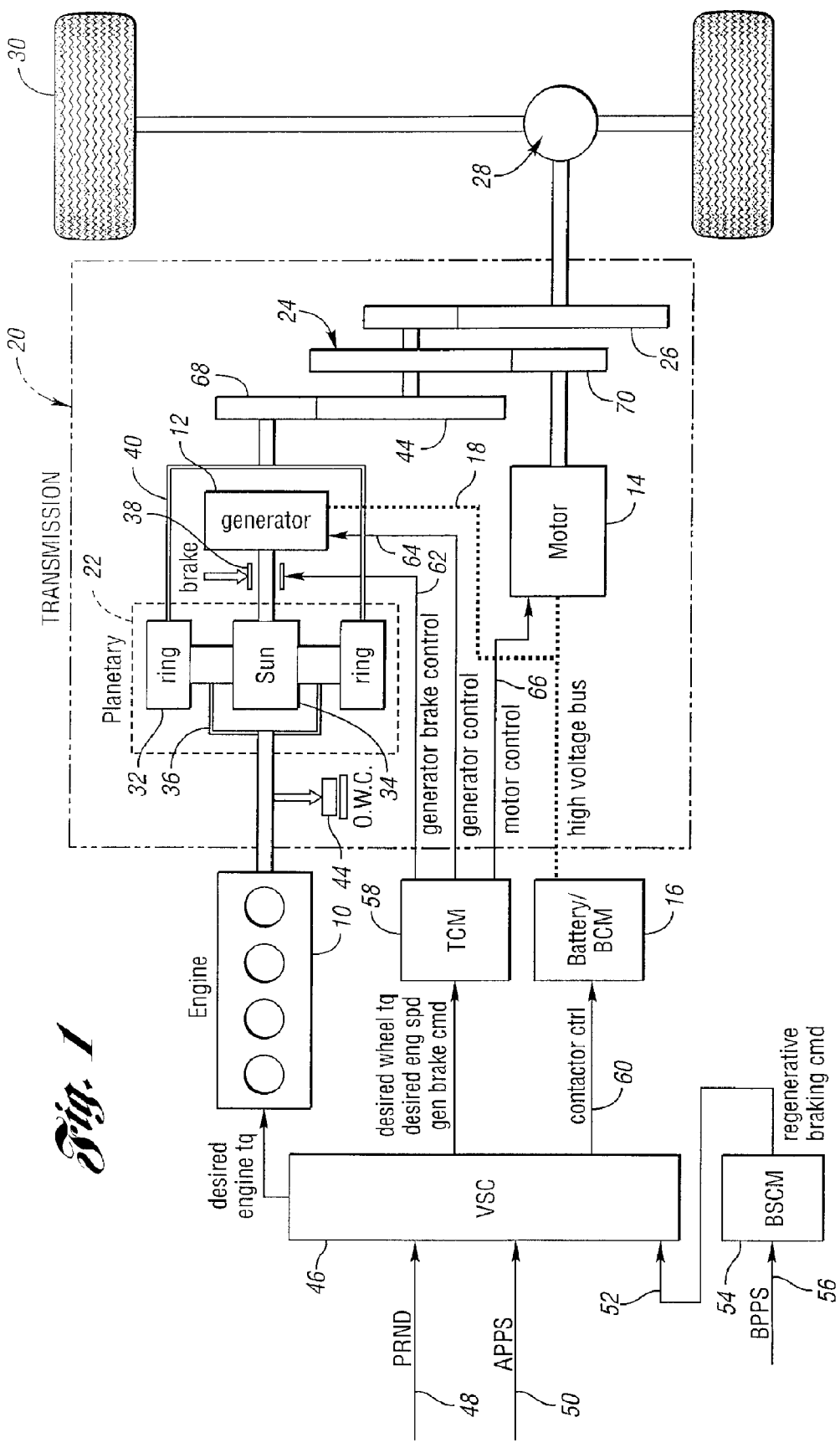
FIG. 1 is a schematic illustration of a series-parallel hybrid electric vehicle powertrain capable of using the present invention.

FIG. 1 shows a series-parallel hybrid electric vehicle powertrain. A primary power source in the configuration of FIG. 1 is engine 10. A secondary power source is a combination of a generator 12, an electric motor 14 and a battery and battery control module 16. These components of the combination are electrically coupled by electrical high voltage bus 18.

The powertrain includes a transmission 20, which comprises a planetary gear unit 22, the generator 12 and the motor 14, as well as torque transfer counter shaft gearing 24. A power output gear element of the gearing 24, seen at 26, is drivably connected to a differential-and-axle assembly 28, which distributes power to vehicle traction wheels 30.

The planetary gear unit 22 comprises a ring gear 32, a sun gear 34, a planetary carrier 36 and planet gears rotatably supported on carrier 36 for engagement with ring gear 32 and sun gear 34.

Sun gear 34 is drivably connected to the rotor of generator 12. A generator brake 38, when applied, will anchor the rotor of the generator 12 to hold it stationary, thereby establishing a torque reaction point at sun gear 34 for mechanical torque flow from the engine to the gearing 24. The torque flow path is established by torque transfer member 40.

The power output shaft for the engine is connected drivably to the carrier 36, as shown at 42. An overrunning coupling 44 acts as a reaction brake during a generator drive mode for the powertrain, as will be explained subsequently.

An overall controller for the operating modes of the powertrain is the vehicle system controller 46 (VSC), which receives various inputs including driver inputs at 48 and 50. The input at 50 is an accelerator pedal position sensor signal (APPS) and the input at 48 is driver selection for "park," "reverse," "neutral" or "drive range" (PRND). A regenerative braking command input for the vehicle system controller is shown at 52. The regenerative braking command is issued by a brake system control module 54 (BSCM), which receives a brake demand corresponding to driver vehicle brake pedal position sensor signal 56 (BPPS).

The vehicle system controller 46 issues command signals to a transmission control module 58 (TCM), including a desired wheel torque, a desired engine speed and a generator brake command. It also issues a battery control module contactor control signal to the battery control module 16, as shown at 60.

The transmission control module issues a generator brake control signal to brake 38 through a signal flow path 62. It issues a generator control signal to the generator 12 through a signal flow path 64. It issues a motor control signal to the motor 14 through signal flow path 66.

The ring gear 32 is connected through torque transfer member 40 to input gear element 68 of the torque transfer gearing 24. The rotor of motor 14 is drivably connected to gear element 70 of the torque transfer gearing 24.

Figure 2:
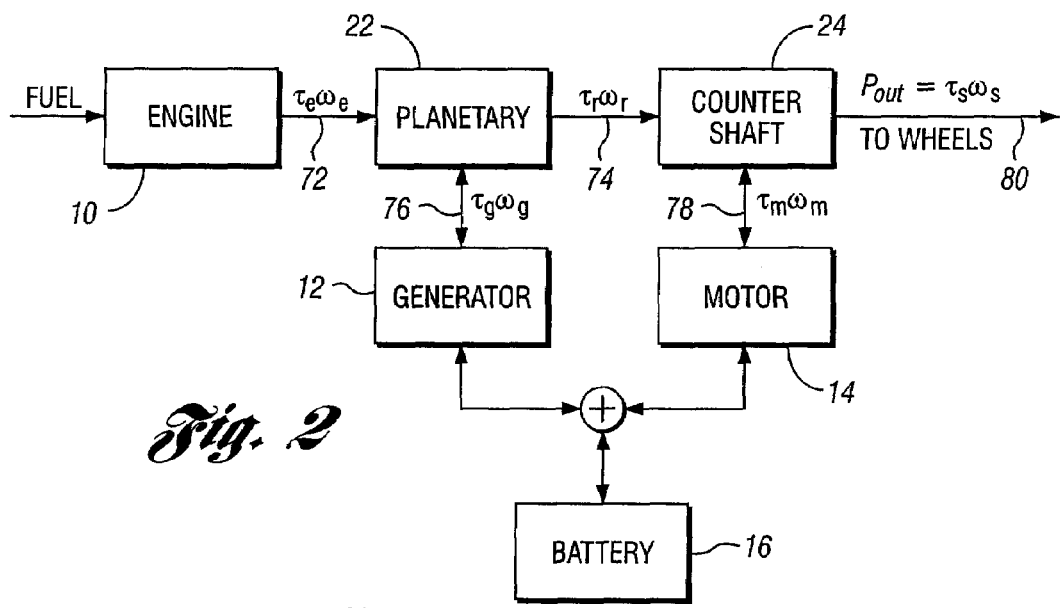
FIG. 2 is a schematic diagram of power flow in the powertrain of FIG. 1.

FIG. 2 is a power flow diagram for the powertrain illustrated schematically in FIG. 1. There are two power flow paths for the engine to deliver its output power, which is indicated in FIG. 2 at 72. The first power flow path extends from the engine to the carrier 36, to the ring gear 32 and to the countershaft gearing 24. Power transfer from the planetary carrier 36 to the countershaft gearing 24 is shown at 74. The second power flow path is an electrical power flow path 76 from the engine 10 to the generator, to the motor 14 and from the motor 14 to the countershaft 24, as shown at 78. The output power to the wheels is shown at 80.

Under normal powertrain operating conditions with all of the sub-systems and components functional, the vehicle system controller 46 interprets a driver's input at 48, 50 and 52 and then determines the wheel torque command based on the driver demand and the powertrain power limits. The vehicle system controller determines when and how much power and torque each power source needs to satisfy the driver's demand and to achieve a specified vehicle performance. This is done by an engine operating management strategy (EOMS) subsystem 88 of FIG. 4, as will be explained subsequently.

Figure 3:
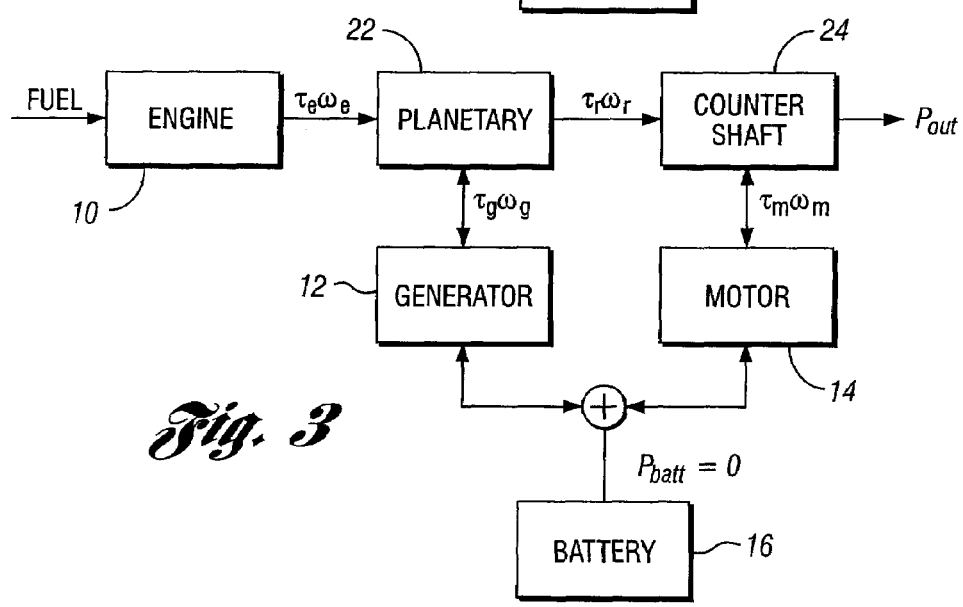
FIG. 3 is a schematic diagram of power flow in the powertrain of FIG. 1 when the powertrain is operating with a charge-neutral, positive power split operating mode.

To demonstrate this strategy, an analysis of the energy flow and the efficiency for a given operating condition will be described with reference to FIG. 3, in which the engine is required to provide power to meet a driver demand with no power flow from or into the battery. This operating condition is called a "charge-neutral positive power split." As indicated in FIG. 3, engine power output is delivered to the traction wheels to satisfy the driver demand through a mechanical power flow path and an electrical power flow path. There is no power delivered to or from the battery. The system power output is calculated as follows:

$$P_{out} = T_r \omega_r + T_m \omega_m, \quad (1)$$

where:

$T_r$=ring gear torque (NM);

$\omega_r$=ring gear speed (radians/second);

$T_m$=motor torque (NM); and $\omega_m$=motor speed (radians/second).

In equation (1), $T_r \omega_r$ is the power delivered through the mechanical path and the term $T_m \omega_m$ is the power delivered through the electrical path. Based on the planetary characteristics of the gear unit 22 and an assumed generator efficiency of $\eta_{g\_m2e}$ and a motor efficiency $\eta_{n\_e2m}$, equation (1) can be rewritten as follows:

$$P_{out} = T_{e2r}T_e\omega_r + T_g\omega_g\eta_{g\_m2e}\eta_{m\_e2m} \quad (2)$$

$$= T_{e2r}T_e\omega_r + T_{e2g}T_e\omega_g\eta_{g\_m2e}\eta_{m\_e2m},$$

where:
$T_e$=engine output torque (NM);
$T_g$=generator torque (NM);
$\omega_g$=generator speed (radians/second);
$T_{e2r}$=torque ratio from engine to ring gear, $1/(1+\rho)$;
$T_{e2g}$=torque ratio from engine to generator, $\rho/(1+\rho)$;
$\rho$=the sun gear's number of teeth divided by the ring gear's number of teeth;
$\eta_{g\_m2e}$=the assumed generator efficiency during the conversion of mechanical power to electrical power; and
$\eta_{m\_e2m}$=the assumed electrical efficiency during the conversion of electrical power to mechanical power.

Assuming that the engine efficiency is $\eta_e$, the system input power $P_{in}$ is:

$$P_{in} = T_e\omega_e/\eta_e, \quad (3)$$

where:
$\omega_e$=engine speed (radians/second).

The total system efficiency then is $\eta_{total}$, as defined by the following equation:

$$= (T_{e2r}T_e\omega_r + T_{e2g}T_e\omega_g\eta_{g\_m2e}\eta_{m\_e2m})/(T_e\omega_e/\eta_e) \quad (4)$$

$$= \eta_e(T_{e2r}\omega_r + T_{e2g}\omega_g\eta_{g\_m2e}\eta_{m\_e2m})/(\omega_e)$$

Noting that $\omega_e = T_{e2r}\omega_r + T_{e2g}\omega_g$ with a speed sign convention as positive when rotating clockwise, total system efficiency then is:

$$\eta_{total} = \eta_e(T_{e2r}\omega_r + T_{e2g}\omega_g - T_{e2g}\omega_g + T_{e2g}\omega_g\eta_{g\_m2e}\eta_{m\_e2m})/\omega_e.$$

The foregoing expression for $\eta_{total}$ can be rewritten as follows:

$$\eta_{total} = \eta_e\{1 - (1-\eta_{g\_m2e}\eta_{m\_e2m})T_{e2g}\omega_g/\omega_e\}.$$

It can be noted from equation (5) that the engine efficiency has the most influence on the total system efficiency. The strategy of the invention, therefore, will determine an engine speed and torque operating zone based upon the speed and torque values for the engine that will achieve maximum total powertrain efficiency.

As previously indicated, it is possible to operate the engine at a higher efficiency for a given driver demand for power because of the divided engine power flow paths. The strategy of the invention, however, will make it possible to achieve higher overall powertrain system efficiency without a resultant reduction in efficiency of the motor and generator, which would result in a lower overall powertrain system efficiency. The total powertrain efficiency determination method uses an engine speed and torque operating relationship for a given vehicle speed and a given total power command so that the goal of the control method is maximum total powertrain efficiency rather than maximum engine efficiency. The implementation of this method is schematically illustrated in the diagram of FIG. 4.

Figure 4:
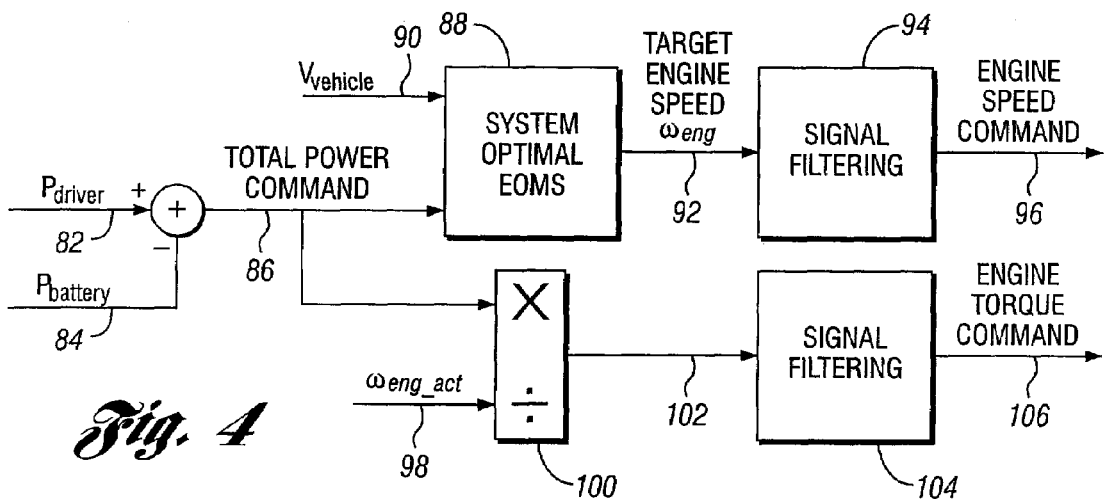
FIG. 4 is a schematic illustration of an implementation of a system optimal engine operating management strategy.

A driver power demand 82 and battery charge and discharge power requests shown at 84 are combined to produce a total power command, as shown at 86 in FIG. 4. A system optimal engine operating management strategy control sub-system (EOMS) 88 receives a vehicle speed signal at 90 and the total power command at 86. A target engine speed at 92 is developed by the system optimal engine operating management strategy sub-system 88, the target engine speed being developed so that the total powertrain loss is a minimum, as will be explained subsequently. Instead of maximizing total system efficiency, optimization is achieved by minimizing total system losses.

The target engine speed signal at 92 is filtered by a signal filtering sub-system 94 to produce an engine speed command at 96. An actual engine speed measurement seen at 98, which is of a different value than the engine speed command at 96, is combined with the total power command 86 by multiplier sub-system (math map) 100. Using the total power command and the actual engine speed, sub-system 100 computes an engine torque command at 102

$$\left(\tau_{eng\_cmd} = \frac{P_{total\_cmd}}{\omega_{eng\_act}}\right)$$

which is filtered at 104 to produce a filtered engine torque command 106.

As will be explained subsequently with reference to FIG. 6, the filtering at 104 is done to avoid an instantaneous, uncontrolled spike or pulse in battery power command when a sudden change in total power command is made. The vehicle system controller, at the instant an increased total power command is made, will provide an increased engine torque during a transition from one total power command to another. This will give a quick response to a driver's demand for a new power level (new torque at the wheels). The engine torque command is filtered at 104, however, to introduce a filter time lag in the engine torque command change, which avoids a battery power command spike during the total power command transition. As the engine speed then increases, the engine torque command will decrease over time to a steady-state value.

The system optimal EOMS shown at 88 in FIG. 4 will maximize the total system efficiency for a given vehicle speed and total power command by adjusting the engine speed command, followed by an adjustment of the engine torque command. It maximizes total system efficiency by minimizing total losses in the system. This concept is expressed by the following equation:

$$\left[\underset{\omega_{eng}}{\text{Min}(P_{total\_loss})}\right] = \quad (6)$$

$$f_1(P_{total\_cmd}, V_{veh}, P_{eng\_loss}, P_{mot\_loss}, P_{batt\_loss}, P_{mech\_loss})$$

where:
$P_{eng\_loss} = f_2(\omega_{eng}, T_{eng})$
$P_{gen\_loss} = f_3(\omega_{gen}, T_{gen})$
$P_{mot\_loss} = f_4(\omega_{mot}, T_{mot})$
$P_{batt\_loss} = f_5(V_{batt}, I_{batt})$
$P_{mech\_loss} = f_6(P_{total\_cmd}, V_{veh})$
$T_{eng} = f_7(P_{total\_cmd}, \omega_{eng})$
$\omega_{gen} = f_8(\omega_{eng}, V_{veh})$
$T_{gen} = f_9(T_{eng})$
$\omega_{mot} = f_{10}(V_{veh})$
$T_{mot} = f_{11}(T_{eng}, P_{total\_cmd}, V_{veh})$
$I_{batt} = f_{12}(\omega_{gen}, T_{gen}, \omega_{mot}, T_{mot})$
$V_{batt} = f_{13}(I_{batt})$ In the preceding equations, the functions $f_2$ through $f_6$ are loss functions for each of the sub-systems and components of the powertrain of FIG. 1. These loss functions are located in tables or maps that are pre-calibrated. Each map corresponds to one of the loss functions. The determinations of the loss functions are mapped and entered into a table. The table is stored in ROM memory registers of the vehicle system controller. The stored values are based on experimental data.

The loss functions $f_7$ to $f_{11}$ are determined by the physical configuration of the powertrain, including the gearing ratio and the battery characteristics. Each mathematical formulation of a power loss indicates that for a given vehicle speed and a total power demand, there is a unique solution in the determination of target engine speed such that the total loss of the system is a minimum.

After the power loss calculations for the several sub-systems or components are carried out, the values are compared, as indicated in equation (6).

For any given engine speed command at 96, there will be a computation of the power losses as indicated above. The minimum value for those computations of power loss at that engine speed command then is determined. The engine speed that will correspond to the minimum total power loss is indicated at 96 in FIG. 4. That speed will not be the same as the engine speed that would correspond to maximum engine efficiency, but it is a speed that corresponds to maximum total system efficiency.

In an alternate control routine, it is possible to achieve minimization of total system losses by developing off-line, in a pre-calibration procedure, a look-up table that can be stored in a read-only memory (ROM) portion of the memory of the vehicle system controller. Such a table is schematically illustrated in FIG. 5. As indicated in FIG. 5, for every total power command and for each corresponding vehicle speed, there is a predetermined engine speed that will achieve minimum total powertrain losses, which results in maximum powertrain efficiency. The use of a table of the kind shown in FIG. 5 may reduce the number of computations in the central processor unit for the vehicle system controller during each of its control loops since the individual calculations of power losses of the individual components of the powertrain can be eliminated and replaced by the engine speed values computed off-line and pre-recorded in a table, such as the table of FIG. 5.

Figures 5, 6:
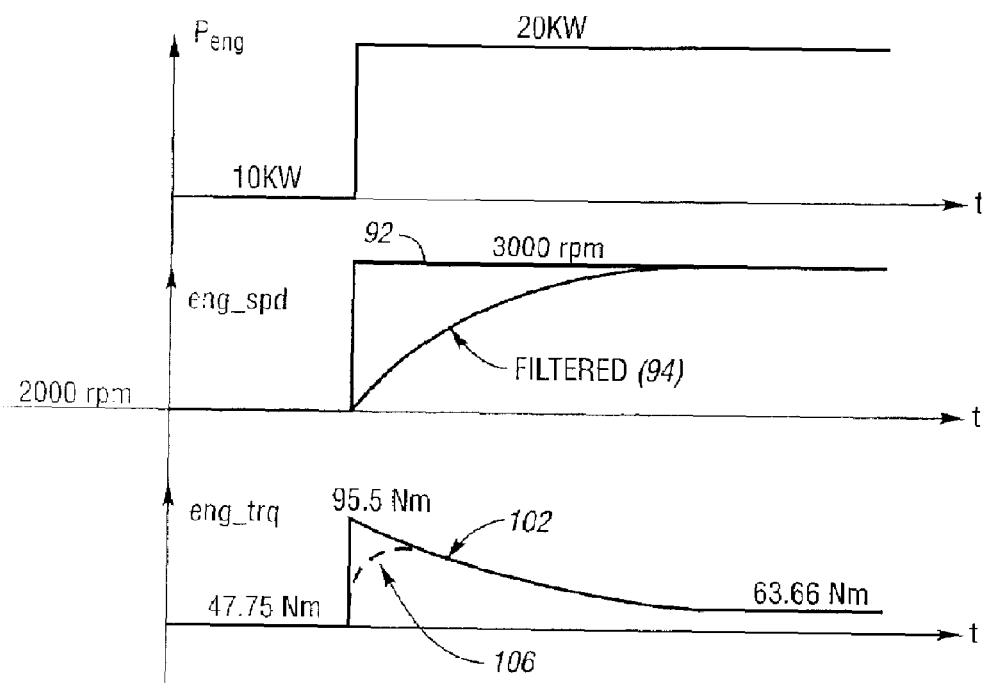
FIG. 5 is a table, stored in controller memory, showing calibrated engine speeds as functions of vehicle speeds and power commands corresponding to maximum total powertrain system efficiency.
FIG. 6 is a graph showing the behavior of powertrain variables in the implementation of FIG. 4.

FIG. 6 is a graphical illustration of an example of how the system of FIG. 4 functions. If it is assumed that the driver power demand is at 10 kw initially, the engine speed may be 2000 rpm and the engine torque may be 47.74 Nm. If a power demand is made for 20 kw, a target engine speed at 92 may be 3000 rpm. At that instant, the engine torque will be commanded to increase to a higher level, such as 95.5 Nm from 47.75 Nm. That increase will be perceived by the driver as a response to the request by the driver for more total power. The engine speed cannot increase immediately to 3000, so it is filtered at 94 to provide a filtered signal at 96, seen in FIG. 4.

The power command at 86, together with the actual measured engine speed at 98 in FIG. 4 will produce an unfiltered engine torque command 102, which is filtered at 104 to effect a slow rising engine torque command at 106. After a transition from a total power command of 10 kw to a total power command of 20 kw is completed, the filtered engine torque blends with engine torque command plot at 102 in FIG. 6. This procedure will avoid a spike in the battery power command at the beginning of the transition.

Although an embodiment of the invention has been described, it will be apparent to a person skilled in the art that modifications may be made without departing from the scope of the invention. All such modifications and equivalents thereof are intended to be included within the scope of the following claims.

What is claimed is:

1. An engine power management method for a hybrid electric vehicle powertrain having an engine, an electric generator, an electric motor, a battery electrically coupled to the generator and the motor, and gearing mechanically coupling the motor, the generator and the engine to define a power delivery system with a mechanical power flow path and an electrical power flow path as power is distributed to vehicle traction wheels, the method comprising the steps of:
   determining engine power loss for a given vehicle speed and for a given total power command;
   determining generator power loss for the given vehicle speed;
   determining motor power loss for the given vehicle speed;
   determining battery power loss for the given vehicle speed;
   determining mechanical power loss for the given vehicle speed;
   comparing the power losses for the engine, the generator, the motor, the battery and the mechanical power loss for a given vehicle speed;
   and determining an engine speed corresponding to a minimum value for the compared power losses whereby the powertrain operates with an optimum total power delivery system efficiency.

2. The method set forth in claim 1 wherein the step of determining power loss for the engine comprises execution of a functional relationship of engine speed and engine torque.

3. The method set forth in claim 1 wherein the step of determining power loss for the generator comprises execution of a functional relationship of generator speed and generator torque.

4. The method set forth in claim 1 wherein the step of determining power loss for the motor comprises execution of a functional relationship of motor speed and motor torque.

5. The method set forth in claim 1 wherein the step of determining power loss for the battery comprises execution of a functional relationship of battery voltage and battery current.

6. The method set forth in claim 1 wherein the step of determining mechanical power loss comprises execution of a functional relationship of a total power command and vehicle speed.

7. The method set forth in claim 2 wherein engine torque is determined as a function of a total power command and actual engine speed.

8. The method set forth in claim 3 wherein generator speed is determined as a function of a desired engine speed and vehicle speed and generator torque is determined as a function of engine torque.

9. The method set forth in claim 4 wherein motor torque is determined as a function of vehicle speed and motor torque is determined as a function of engine torque, total power command and vehicle speed.

10. The method set forth in claim 5 wherein battery current is determined as a function of generator speed, generator torque, motor speed and motor torque and wherein battery voltage is determined as a function of battery current.

11. The method set forth in claim 1 wherein the step of determining a changed engine torque command during a transition period following a change in total power command;
   computing an unfiltered engine torque command using the change in total power command and actual engine speed;

filtering the unfiltered engine torque command to effect a filter time lag to modify a rate of change of the engine torque command; and increasing the engine torque command during the transition period whereby a quick response to a changed total power command is obtained.

12. The method set forth in claim 11 including the step of filtering an engine speed command following the change in total power command whereby a controlled rate of increase of the engine speed command is affected until a target engine speed is achieved corresponding to a changed total power command and a given vehicle speed.

* * * * *

UNITED STATES PATENT AND TRADEMARK OFFICE
CERTIFICATE OF CORRECTION

| | |
|---|---|
| PATENT NO. | : 7,398,147 B2 |
| APPLICATION NO. | : 11/161424 |
| DATED | : July 8, 2008 |
| INVENTOR(S) | : Shailesh Kozarekar et al. |

It is certified that error appears in the above-identified patent and that said Letters Patent is hereby corrected as shown below:

Column 8, line 54, Claim 9: Delete "torque" and insert --speed--.

Column 8, line 62, Claim 11: Delete "wherein" and insert --including--.

Column 10, line 2, Claim 12: Delete "affected" and insert --effected--.

Signed and Sealed this

Eleventh Day of May, 2010

David J. Kappos
*Director of the United States Patent and Trademark Office*